No. 682,994. Patented Sept. 17, 1901.
L. PARSONS.
APPARATUS FOR STRAINING WATER.
(Application filed July 18, 1901.)

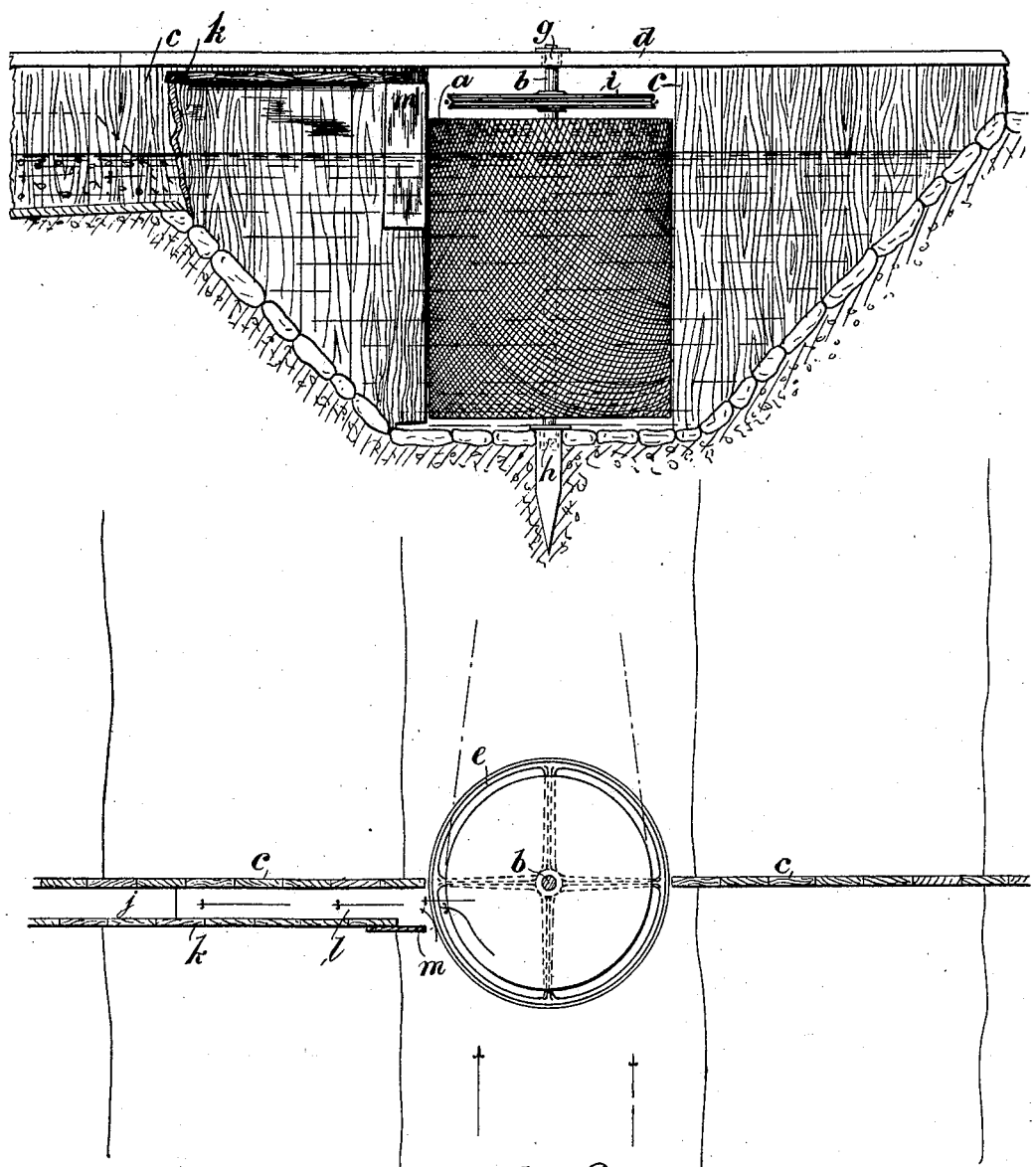

(No Model.) 4 Sheets—Sheet 2.

Attest:
C. Middleton
Edw. L. Reed.

Inventor
Lawrence Parsons
by Ellis Spear
Atty.

No. 682,994. Patented Sept. 17, 1901.
L. PARSONS.
APPARATUS FOR STRAINING WATER.
(Application filed July 18, 1901.)
(No Model.) 4 Sheets—Sheet 3.

Attest
O. H. Middleton
Edw. L. Reed

Inventor
Lawrence Parsons
by Eli Ghur
Atty

No. 682,994. Patented Sept. 17, 1901.
L. PARSONS.
APPARATUS FOR STRAINING WATER.
(Application filed July 18, 1901.)
(No Model.) 4 Sheets—Sheet 4.
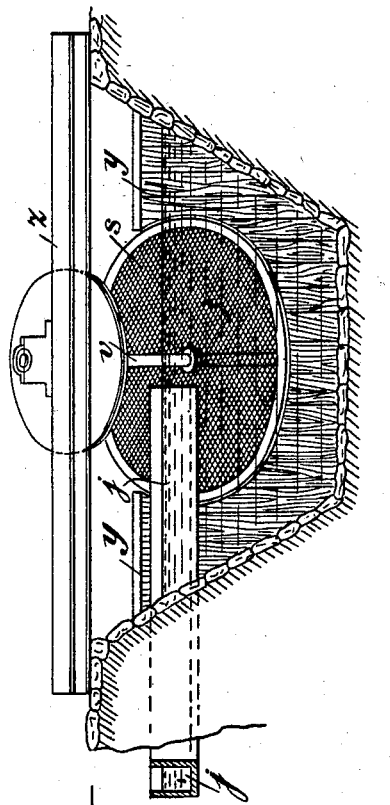
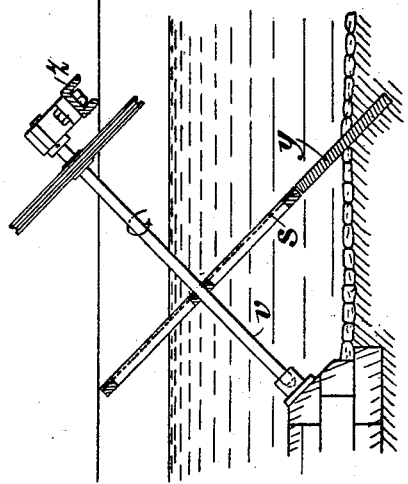
Attest:
Inventor
Lawrence Parsons

UNITED STATES PATENT OFFICE.

LAWRENCE PARSONS, OF BIRR, IRELAND.

APPARATUS FOR STRAINING WATER.

SPECIFICATION forming part of Letters Patent No. 682,994, dated September 17, 1901.

Application filed July 18, 1901. Serial No. 68,865. (No model.)

*To all whom it may concern:*

Be it known that I, LAWRENCE PARSONS, earl of Rosse, a subject of the King of Great Britain and Ireland, residing at Birr Castle, Birr, Kings county, Ireland, have invented new and useful Improvements in Apparatus for Straining Water, (for which I have made application for Letters Patent in Great Britain, No. 22,498, bearing date December 10, 1900, and in Germany, filed June 11, 1901,) of which the following is a specification.

My invention relates to the removal of floating or suspended matter, such as leaves, from the water-supply for turbines and other purposes, and has for its object to provide means whereby the floating or suspended matter may be arrested and automatically cleared away from the arresting or straining surface into a suitable drain or discharge channel.

My invention consists in a moving strainer placed in the course of the head-race or supply-conduit, so that practically the whole of the water passes through it, and in conjunction with the strainer a discharge passage or channel which is so situated that part of the water flows back through the straining-surface, thereby dislodging the leaves and other matter adhering to the strainer and carrying them away through the discharge-channel into the tail-race or drain.

The method of carrying my invention into effect according to various modifications as applied to the head-race of a turbine or other motor is illustrated in the accompanying drawings, in which—

Figure 3:
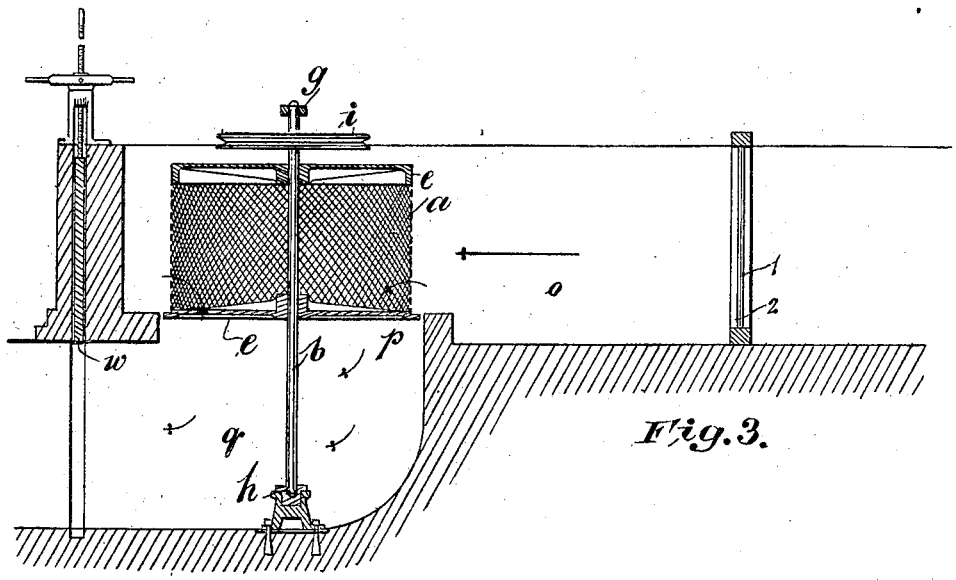
Figure 4:
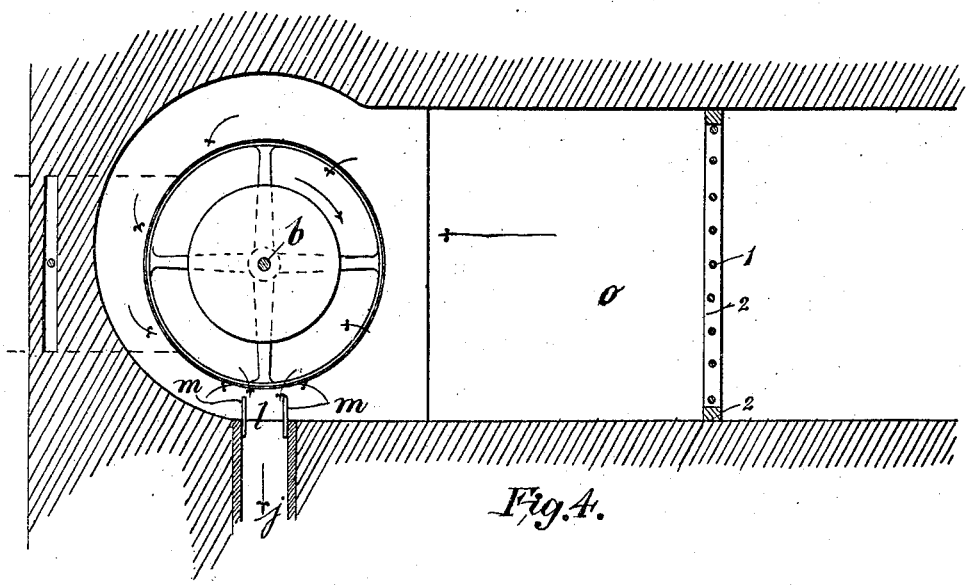
Figure 5:
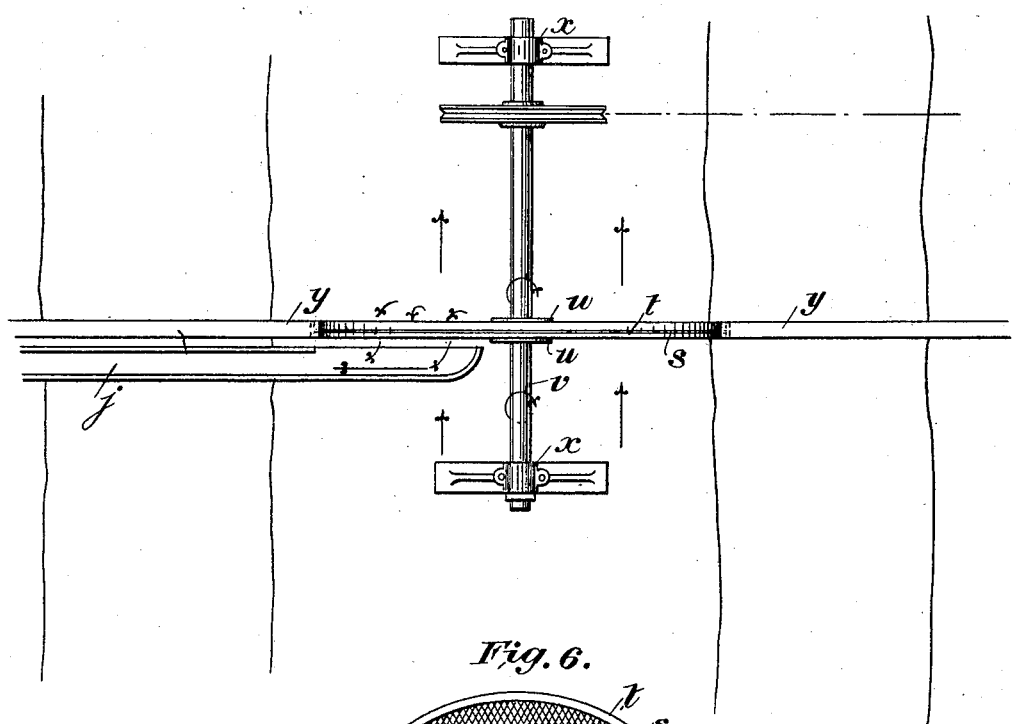
Figure 6:
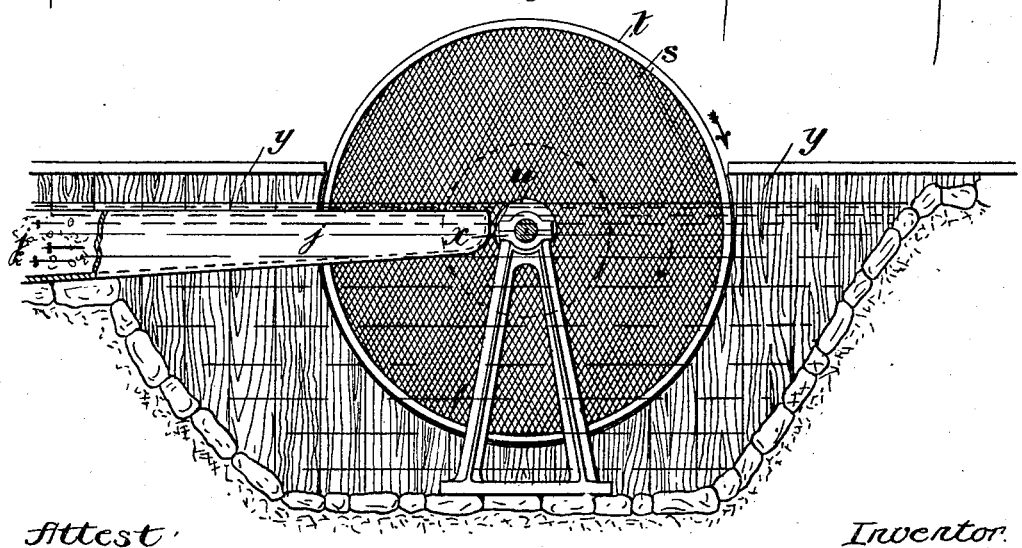

Figures 1 and 2 are respectively a cross-section and a plan of a turbine head-race, showing a strainer in the form of a hollow cylinder through which the main water stream flows at right angles to its axis. Figs. 3 and 4 are respectively a sectional elevation and a plan of a head-race fitted with a hollow cylindrical strainer from which the water discharges axially. Figs. 5 and 6 are respectively a plan and a cross-section of a head-race, showing the strainer in the form of a vertical disk; and Figs. 7 and 8 are respectively a longitudinal and a cross section of a head-race fitted with an inclined disk strainer, the disk being shown in section in Fig. 7.

Like reference-letters indicate corresponding or like parts throughout the several figures.

Referring to Figs. 1 and 2, I provide a hollow cylindrical strainer $a$, which is mounted vertically on a shaft $b$, so as to be capable of rotation in a space formed in a diaphragm $c$, which is fixed to the sides and bed of the head-race, so that the whole water-supply for the turbines flows through the strainer. The strainer may be constructed of perforated metal or wire netting or gauze of suitable mesh, according to the nature of the materials to be removed from the water. It is secured at the top and bottom to the rims of wheels $e$, attached to the shaft $b$. This shaft revolves in bearings $g$ and $h$, formed, respectively, in a cross-bar $d$, attached to the diaphragm $c$, and in the bed of the water-race, and a driving-pulley $i$ is provided, through which the strainer is revolved at a slow speed from the turbine or other source of power by means of belts or ropes and transmission-pulleys. On the inlet side of the strainer I provide a channel or discharge-passage $j$, leading to the tail-race, the entrance $l$ to which channel is formed between a partition $k$ and the diaphragm $c$. The partition $k$ extends along the whole length of the straining-surface, and its extremity is situated at a short distance from the strainer, so as to allow the passage of the accumulated leaves into the entrance to the channel $j$. In order to prevent stoppage of or damage to the strainer, which might result by contact of the accumulation of leaves or other matter on the straining-surface with the partition $k$, I provide the partition with a yielding flap $m$ of suitable flexible material. As the largest accumulation takes place on the strainer near the water-surface, it is only necessary to provide this flap on the partition at its upper part, as shown in Fig. 1; but, if desired, the flap may be attached along the whole edge of the partition $k$. When the apparatus is in action, water flows in the direction indicated by the arrows in Fig. 2, and the leaves and other floating matter adhere to the exterior surface of the strainer, the water passing into the interior of the cylinder. The main portion of the water discharges through the straining-cylinder in the direction of the turbine, and a small part at one side discharges into the entrance *l* to the channel *j* leading to the tail-race. The leaves and other matter adhering to the cylindrical surface are maintained in contact with the surface by the pressure of the entering water and are carried around until they come opposite the passage *l*. As the water feeding this passage comes chiefly from the interior of the cylinder, the leaves which were at first pressed against the exterior surface of the strainer are now forced from the surface into the passage *l*, whence they are discharged through the channel *j* into the tail-race.

In the modification of my invention illustrated in Figs. 3 and 4 the head-race is formed into two parts at different levels. The upper part *o* is provided at its extremity with a circular discharge-passage *p*, opening into the lower part *q* of the head-race. I employ a hollow cylindrical strainer similar to that above described, the bottom of which fits into the passage *p* sufficiently loosely to enable free rotation to be effected. The water in this case in passing from the upper part to the lower part of the head-race must traverse the straining-cylinder *a*, from which it discharges axially. The upper part *o* of the head-race is provided with a circular extremity, so as to form an annulus surrounding the strainer, from which the water has free access to all parts of the straining-surface. The entrance *l* to the channel *j*, which leads to the tail-race, is in this case provided with two flexible flaps *m*, one or other of which yields to prevent stoppage of or damage to the strainer by contact with the accumulation of leaves or other matter adhering to the strainer according to the direction of the rotation imparted to the shaft *b*. *w* is a sluice-valve for controlling the flow of water through the head-race. In this modification of my invention the turbine may conveniently be fitted on same axis as the shaft *b*, and the requisite slow speed of rotation of the shaft *b* may be obtained from the turbine through bevel-gearing. In this case the water discharges from the strainer direct to the turbine.

Referring to Figs. 5 and 6, the straining-surface *s* is in the form of a vertical disk, which is provided at its circumference with a stiffening-ring *t*, while its central part is clamped between two plates *u u*, secured to a horizontal shaft *v*. This shaft revolves in bearings supported on pedestals *x x*, secured to the bed of the head-race, and a driving-pulley is provided by means of which the shaft is revolved from any suitable source. Across the head-race is fitted a wooden partition *y*, in which an opening is cut, the boundary of which opening forms part of a circle of radius slightly larger than the straining-disk *s*. The straining-disk is arranged in the plane of the partition *y*, so that the whole of the water-supply to the turbine passes through it. The duct or channel *j* leading to the tail-race in this case extends nearly into the center of the disk on the ascending side and produces a flow through the disk in the direction opposite to the main flow, thereby clearing off the leaves and other matter as they are brought in front of the channel *j* by the revolution of the straining-disk *s*.

In the modification illustrated in Figs. 7 and 8 the straining-disk *s* and partition *y* are arranged at an inclination to the bed of the head-race, one of the bearings for the shaft *v*, which supports the disk *s*, being supported on an inclined foundation on the bed of the head-race, while the other bearing is supported on a beam *z*, bridging the race. When this apparatus is in action, the shaft *v* is revolved in the direction indicated by the arrows. The water passes through the straining-surface from the upper side and deposits mainly on the ascending part of the disk the floating or suspended matter, which is carried around by the disk till it comes opposite the channel *j*, when it is dislodged by the backward current through the disk and is discharged into the tail-race through the channel *j*.

In place of the pulley-drive which I have illustrated it will be obvious that I may employ bevel or worm and worm-wheel gearing, pawl-and-ratchet gear, or other well-known form of drive, arranged for revolving the strainer at a slow speed.

In addition to my improved straining apparatus, as indicated in Figs. 3 and 4, I provide in the head-race the usual coarse grating, consisting of vertical rods fixed in a frame 2, for arresting logs and large floating objects.

It will be obvious that the device above described is applicable for straining the water-supply for other purposes than the production of motive power without departing from my invention.

Having now described my invention, what I claim as new, and desire to secure by Letters Patent, is—

1. A device for the removal of leaves and other floating and suspended matter from a water-supply comprising a moving strainer through which the water passes in combination with a discharge-passage situated so as to divert a portion of the water back through the straining-surface whereby the arrested matter is cleared away and conveyed into a tail-race or drain, substantially as described.

2. A device for the removal of leaves and other floating or suspended matter from the water-supply to turbines and other motors, consisting of a revoluble hollow cylindrical strainer in combination with a discharge-passage leading to the turbine tail-race and situated so as to divert part of the water-flow from the interior of the cylindrical strainer through the straining-surface, substantially as described.

3. A device for the removal of leaves or suspended matter from the water-supply to turbines and other motors, consisting of a revoluble hollow cylindrical strainer having an axial discharge for the turbine water-supply, in combination with a channel which leads to the tail-race, and is so situated as to produce a current of water through the straining-surface from the interior of the strainer, whereby the matter arrested is dislodged and discharged into the tail-race, substantially as described.

4. A device for the removal of leaves and other floating or suspended matter from the water-supply to turbines and other motors, consisting of a revolubly-mounted strainer placed across the main water-flow, and a discharge-channel, leading to the tail-race and situated so as to divert a part of the water back through the strainer whereby the leaves and other matter are arrested and discharged into the tail-race, substantially as described.

In witness whereof I have hereunto set my hand in presence of two witnesses.

LAWRENCE PARSONS.

Witnesses:
ATKINSON ADAM,
ALBERT E. PARKER.